INVENTORS
Bruce M. Edsall &
Victor C. Moore
BY Lewis D. Burch
ATTORNEY

United States Patent Office 2,903,912
Patented Sept. 15, 1959

2,903,912

AUTOMATIC TRANSMISSION

Bruce M. Edsall, Wayne, and Victor C. Moore, Detroit, Mich., assignors to General Motors Corporation, Detroit, Mich., a corporation of Delaware Application May 8, 1953, Serial No. 353,782

8 Claims. (Cl. 74—677)

This invention relates to torque converter devices or transmissions and has particular relation to infinitely variable fluid circulating and step ratio mechanical torque converters especially applicable for automotive and other uses.

It is proposed to construct a torque converter device or transmission for automotive and other uses which is efficient when operating in coupling, which is capable of developing high starting torque ratios at all throttle opening positions and throughout a wide range of engine speeds, which is capable of extending such high torque ratios without objectionable increases in engine speeds up to vehicle speeds of 30 to 40 miles per hour, which is capable of extending such torque ratios up to such vehicle speeds without the shifting of gears or without objectionable shift feel, and which will deliver a high output torque at wide open throttle at any speed up to vehicle speeds of about or within the vicinity of 75 miles per hour.

Torque converters or transmissions heretofore constructed in an effort to obtain such performance have been complicated, expensive, inefficient in operation or otherwise objectionable.

One form of transmission heretofore proposed for such purposes has involved the use of a fluid circulating converter and coupling element having a variable vane first turbine and a variable vane stator and employed in driving the output shaft from the transmission in various combinations with step ratio gear units of various kinds. In such devices the vanes of the first turbine and stator have been variable to high angles with respect to the axis of rotation of the converter to provide high torque multiplication by the converter and to low angles with respect to the axis of rotation of the converter to provide efficient coupling characteristics for the converter. While such transmissions have promised acceptable performance characteristics throughout most of the required ranges of loads and speeds, the problems involved in constructing both first turbines and stators with adjustable vanes have been difficult and costly.

In an effort to reduce the extent of the complications involved, it has been proposed to construct transmissions of this type with only variable vane stators or only variable vane first turbines. In such transmissions where it has been proposed to employ variable vane stators and fixed vane first turbines it has been considered essential that a first turbine having vanes with the exit angles thereof at more than 60° with respect to the axis of rotation of the converter element or a high angle first turbine be employed. High angle first turbines provide sufficient output torque for starting purposes but insufficient torque at higher car speeds which is required in transmissions for many purposes. Further, first turbines with high angles do not provide efficient free wheeling characteristics and do not produce good coupling efficiency even with stator vanes that are variable from angular positions providing efficient coupling characteristics to angular positions providing good torque multiplication characteristics so that such transmissions also have been considered objectionable.

It has been discovered that the change in the extension in torque multiplication in a fluid converter element having a high angle fixed vane first turbine is not as great when the vanes of the stator are adjusted from minimum to maximum angles as is the change in the extension in performance when a low angle fixed vane first turbine is employed with a stator having vanes that are so adjustable. A low angle fixed vane first turbine is one in which the exit angles of the vanes are 60° or less with respect to the axis of rotation of the converter element. There appears to be a limit to the torque multiplication of a given converter that can be obtained from a high angle first turbine with fixed vanes which can be closely approached by a low angle first turbine with fixed vanes when a stator with adjustable vanes is employed. A low angle first turbine with fixed vanes has efficient coupling performance when the stator vanes are adjusted to low angles. Not only it is easier to construct stators with adjustable vanes than it is first turbines with adjustable vanes but it has been found that the combination of a low angle first turbine with fixed vanes and a stator with adjustable vanes is approximately as efficient in operation in both coupling and torque multiplication and the combination appears to offer greater possibilities of reliable operation and greater extension of torque multiplication.

In order to utilize a low angle first turbine with fixed vanes and an adjustable vane stator in a transmission for automotive and other purposes, it is possible to provide several arrangements involving the use of step ratio reduction gearing to obtain an extension in performance at all vehicle speeds and without any noticeable shift feel in the low range of vehicle speeds below 30 to 40 miles per hour.

In the present instance it is proposed to connect the first turbine to the output shaft through any suitable step ratio reduction gear unit and to provide means under the control of the vehicle operator for connecting the second turbine to the ouput shaft either directly or through a second step ratio reduction gear unit. However, due to the inherent characteristics of the converter element there will also be no objectionable shift feel in the operation of the transmission at vehicle speeds below 30 to 40 miles per hour even though the second turbine is connected to the driven shaft through the second step ratio reduction unit. This will be apparent when it is considered that the torque output of the first turbine decreases as the torque output of the second turbine increases, meaning that at speeds below 40 miles per hour the element being shifted carries only part of the engine torque. Likewise any change in the angular position of the vanes of the stator will effect the torque multiplication characteristics of the transmission only gradually and will not be noticeable as a shift feel.

It is further proposed to provide the transmission with any suitable hydraulic or other control and actuating means providing a driving range in which the second turbine will be connected to the output shaft through a step ratio reduction gearing unit only at relatively wide open throttle positions, a low range in which the second turbine will be connected to the output shaft through a step ratio reduction gearing at all throttle positions and at vehicle speeds below high vehicle speeds of about 75 miles per hour, a braking range in which the first turbine is prevented from free-wheeling throughout a suitable range of vehicle speeds to produce excessive heat in the fluid circulating member to be dissipated in any suitable manner, a suitable reverse range and a neutral position or range where both the first and second turbines are permitted to operate without applying appreciable torque to the output shaft.

Also it is proposed to provide suitable control and actuating means for varying the angular position of the stator vanes. With such control and actuating mechanism it is proposed to operate the stator vanes at low angle positions in coupling and at low angle positions when starting at low throttle opening positions. As the throttle is moved from low throttle opening positions to wide open throttle position the control and actuating mechanism will progressively increase the angular positions of the stator vanes with respect to the axis of rotation so that the stator vanes will be positioned at high angle positions at wide open throttle when maximum torque multiplication is required. In the present instance it has been found that low angle positions for the stator vanes of about 24° provide efficient coupling performance and that the variation from low to high angle positions may extend throughout the range of from 24° to about 84°.

Figure 1:
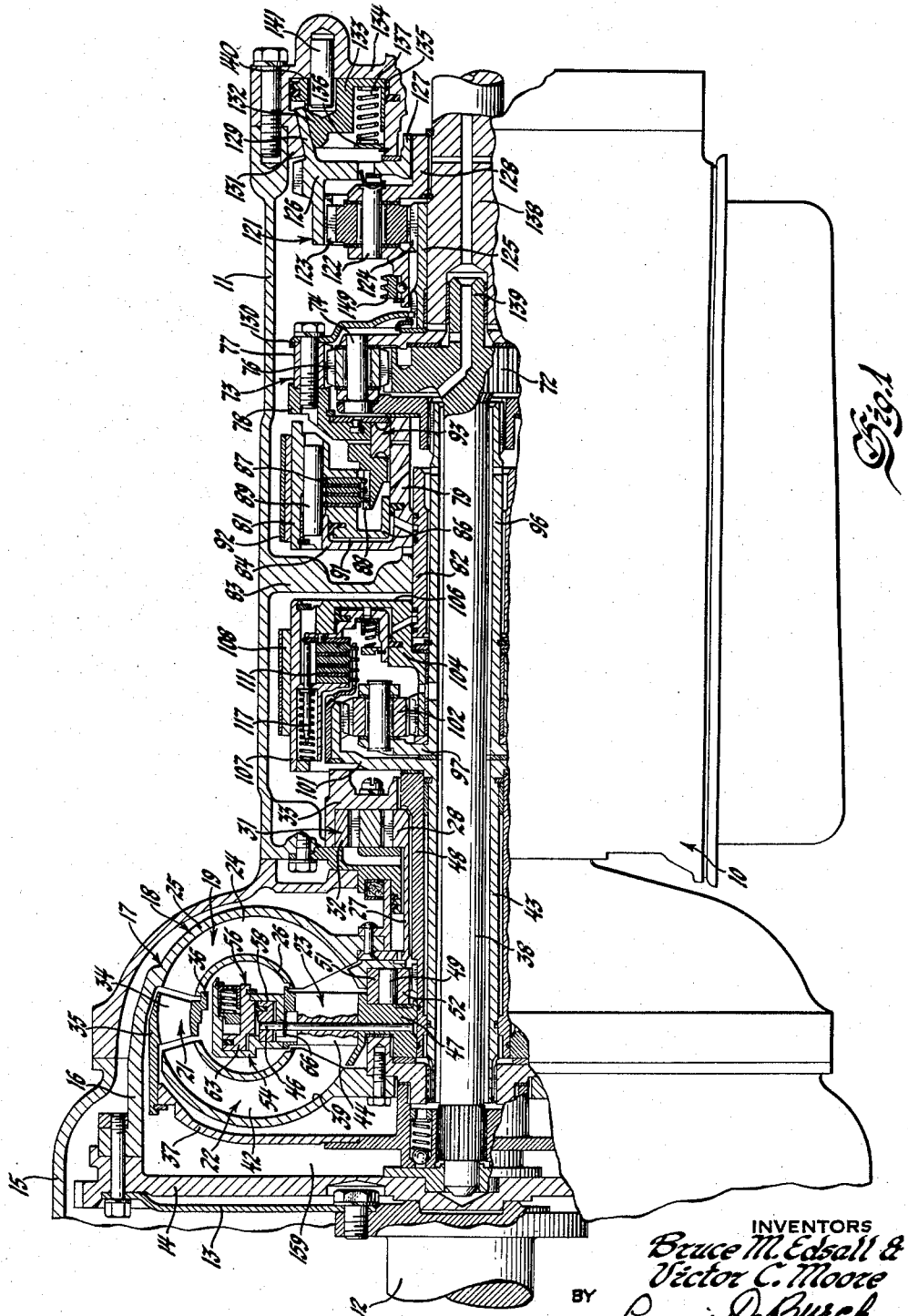
Figure 1 is a side elevational view of a torque converter device or transmission mechanism with the upper part thereof broken away to show the interior of the mechanism in longitudinal sectional view.
Figure 2:
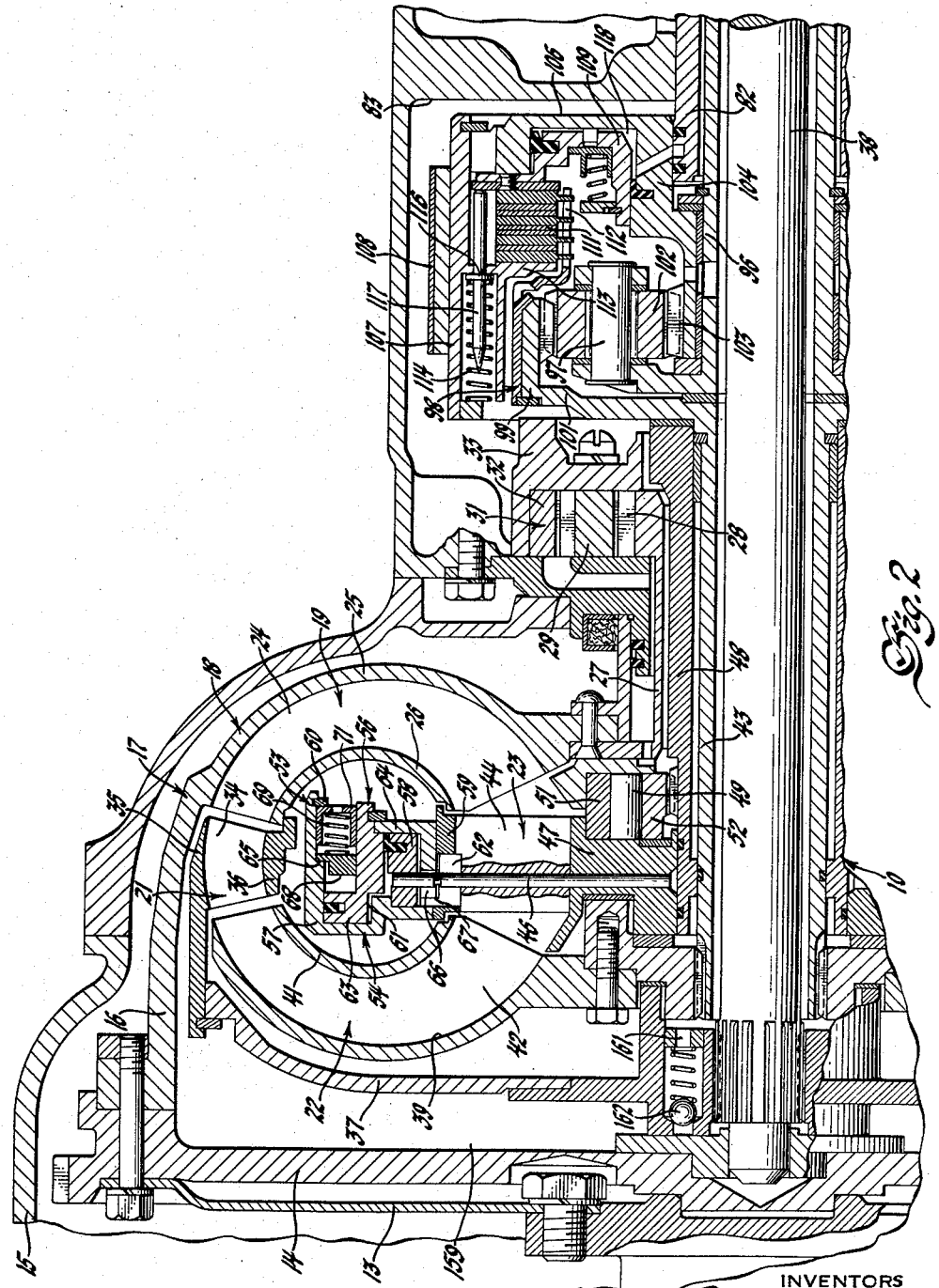
Figure 2 is an enlarged side elevational view of the front portion of the transmission shown by Figure 1.

Referring particularly to Figures 1 and 2, the transmission 10 embodying the invention comprises a casing 11 for enclosing the mechanism and adapted to be supported in any suitable manner. In the present instance the transmission 10 is designed for operation with an automotive vehicle so that the casing 11 is adapted to be secured at the rear end thereof to the vehicle frame and at the front end thereof to the rear of the engine casing 15 by which the vehicle may be driven. The transmission 10 has an input shaft 12 which may also be the output shaft or crankshaft of the engine in casing 15 and which may be secured by a disk 13 to the engine flywheel indicated at 14. The flywheel 14 may be extended rearwardly by a casing member 16 to provide a casing 17 for a fluid circulating converter indicated at 18.

The converter 18 is formed to provide an impeller 19, a first turbine 21, a second turbine 22 and a stator 23. The impeller 19 is formed to provide fixed, spaced and parallel vanes 24 projecting inwardly from an arcuate and annular part 25 of the casing member 16 and the inner extremities of which are formed integrally with an arcuate and annular inner wall 26. The impeller 19 and the casing 17 including the flywheel 14 are adapted to be rotated by the shaft 12 whenever the engine of the vehicle is operated. The inner peripheral edge of the casing member 16 is secured to a tubular shaft 27 the rear end of which is splined at 28 to the driving member 29 of a liquid circulating pump indicated at 31. The pump 31 is adapted to supply liquid for operating the converter 18 and the hydraulic control and actuating system for operating the transmission 10 whenever the shaft 12 is being driven. The casing 32 of the pump 31 is secured rigidly to the housing 11 by a support member indicated at 33.

The first turbine 21 is of arcuate annular form and provides fixed, spaced and parallel vanes 34 which project inwardly from outer wall 35. The vanes 34 merge at the inner extremities thereof in an annular wall indicated at 36. The first turbine 21 is secured by disk member 37 to the front end of a shaft 38 which projects rearwardly through the front part of the transmission 10 on the axis of rotation of the converter 18.

The second turbine 22 comprises outer and inner annular walls 39 and 41 respectively and between which are rigidly secured in spaced and parallel relation to one another the vanes indicated at 42. The outer wall 39 of the second turbine 22 is secured rigidly to the forward end of a tubular shaft 43 which projects rearwardly through the converter element 18 and around the front end of the shaft 38.

The stator 23 comprises spaced and parallel vanes 44 which are arranged annularly about the axis of rotation of the converter element 18 and around the inner periphery thereof. Each of the vanes 44 is mounted upon a radially disposed shaft such as that indicated at 46 with the inner ends of the shafts 46 being rotatably mounted in a reactor ring or support indicated at 47. The reactor ring 47 is adapted to be rotatably mounted upon the forwardly disposed end of a tubular shaft 48 which is disposed between the tubular shafts 27 and 43. The rear end of the tubular shaft 48 is rigidly secured to the casing 11 through the support member 33. Liquid supplied to the interior of the casing 17 will be circulated by the impeller 19 in a closed toroidal path, through the first turbine 21, the second turbine 22, the stator 23 and the intake side of the impeller 19. When the converter unit 18 is operating in coupling the ring 47 is adapted to rotate in the same direction as the impeller 19 the first turbine 21 and the second turbine 22 upon the forwardly disposed end of the tubular shaft 48. However, when the converter unit 18 is operating as an infinitely variable torque ratio changing device and prior to the coupling operation of the converter unit 18 the stator 23 is adapted to be prevented from reverse rotation by a freewheeling device or brake indicated at 49. The movable element 51 of the brake 49 is secured rigidly to the reactor ring 47 whereas the stationary element 52 thereof is splined or otherwise secured rigidly to the forwardly disposed end of the stationary tubular shaft indicated at 48. The stator vanes 44 may be adjustably mounted between the delivery side of the second turbine 22 and the inlet side of the impeller 19 in any suitable manner. In the present instance the stator vanes 44 operate between pre-determined angles with respect to the axis of rotation of the converter unit 18. Such operation may be brought about by providing the stator vane actuating mechanism indicated at 53 which is located in the annular space within the inner walls of the impeller 19, the first turbine 21 and the second turbine 22. The vane actuating device 53 comprises a cylinder 54 and a piston 56. The cylinder 54 comprises members 57, 58 and 59 all of which are secured together. Members 57 and 58 form an annular expansion chamber 61 and the member 58 provides bearings for the outer ends of the shafts 46. Member 59 forms an annular ring surrounding the outer ends of the vanes 44 and provides bearing means for enlarged cylindrical ends 62 formed on each of the vanes 44. The piston 56 comprises a member 63 which is moved inwardly and outwardly for the purpose of expanding and contracting the chamber 61 and a flanged actuating member 64 secured rigidly thereto. Actuating member 64 has slots 66 formed therein and adapted to permit movement of the member 64 with respect to the shafts 46 to engage and to actuate cam follower lugs 67 projecting into the slots 66 from the enlarged ends 62 of the vanes 44. When the piston 56 moves inwardly and outwardly with respect to the cylinder 54 the actuating member 64 will rotate the vanes 44 between the pre-determined angular positions with respect to the axis of rotation of the converter unit 18 by operation of the cam followers 67 within the cam slots 66. The piston member 63 has a ring 68 slidably disposed on the exterior surface and adapted to engage an annular abutment 65 found on the cylinder 57 externally of the expansion chamber 61. A plurality of springs 69 are compressed between ring 68 and a channel ring 71 secured to the cylinder member 57 by an expansible ring indicated at 60. It will be apparent that the spring 69 will tend to urge the ring 68 against the abutment 65. Movement of the piston member 63 in response to fluid pressure in the expansion chamber 61 will move the vanes 44 upon the shafts 46 to increase the angular position of the vanes with respect to the axis of rotation of the unit 18. When the piston member 63 moves within the cylinder member 57 far enough to engage the ring 68 the movement of the piston member will be discontinued until the fluid pressure in the expansion chamber 61 is great enough to overcome the force of the springs 69 tending to hold the ring 68 against the abutment 65. However, when this spring force is overcome the piston member 63 will continue to move and to rotate the vanes 44 upon the shafts 46 into the maximum angular positions thereof with respect to the unit 18. The vanes 44 are at the minimum angular positions thereof with respect to the axis of rotation of the unit 18 when fluid is exhausted from the expansion chamber 61 and the piston member 63 is spaced from the ring 68 and abuts the cylinder member 57.

The rear end of the shaft 38 which is driven by the first turbine 21 terminates in a sun gear 72 forming a part of a planetary gear set or step ratio gear reduction unit indicated at 73. The gear unit 73 comprises a carrier 74 having pinions 76 rotatably mounted thereon and meshing with the gear 72 and with a ring gear 77 surrounding the carrier 74. The ring gear 77 is secured to a clutch member 78 rotatably mounted on the hub 79 of a brake drum element 81. The hub 79 is in turn rotatably mounted on the exterior surface of a bearing sleeve 82 which is rigidly supported by a support member 83 extending transversely across casing 11. The hub 79 and drum 81 also form a cylinder 84 in which a piston 86 is located. Arcuately formed clutch elements 87 are slidably disposed on guides 88 formed on the clutch member 78 and on pins 89 disposed in openings formed around the inner peripheral part of the drum 81. When fluid under pressure is supplied to the chamber 91 between the piston 86 and the cylinder 84 the clutch plates 87 will be engaged for the purpose of securing the ring gear 77 to the unit comprising the drum 81. When the fluid under pressure in the chamber 91 is exhausted the clutch plates or elements 87 move upon the guides 88 and the pins 89 to disengage the clutch element 87. Such movement is brought about by having release springs disposed against the piston so that when pressure in the chamber 91 is released the plates will spring away from one another. The drum 81 has a brake band 92 secured to the casing 11 and adapted to be tightened upon the drum 81 to prevent rotation of the drum when this is desired. In order to prevent rotation of the ring gear 77 in one direction and when rotation of the drum 81 is prevented by the band 92 there is provided between the clutch member 78 and the hub 79 a one way clutch device indicated at 93. The one way clutch 93 will permit rotation of the ring gear 77 in the same direction as the sun gear 72 when the rotation of the carrier 74 does not cause the ring gear 77 to be a reaction member.

The carrier 74 is rigidly secured to a tubular shaft 96 disposed and rotatably mounted between the supporting sleeve 82 and the shaft 38. The forward end of the shaft 96 also terminates in a carrier 97 of a front step ratio reduction gear unit indicated at 98. The gear unit 98 includes a ring gear 99 secured by a support 101 to the rear end of the tubular shaft 43 which is driven by the second turbine 22. The carrier 97 has planet gears 102 which operate between the ring gear 99 and a sun gear 103 formed on a hub 104 which is rotatably mounted on the end of the sleeve 82 which projects forwardly of the support 83. The hub 104 also forms a part of a cylinder 106 having a brake drum 107 formed as a part thereof. Rotation of the brake drum 107 and the sun gear 103 may be prevented by a brake band 108 one end of which is secured rigidly to the casing 11. The cylinder 106 receives a piston 109 adapted to engage and hold in frictional contact with one another the parts of a multiple plate clutch element indicated at 111. Alternate ones of the plates of the clutch element 111 are prevented from rotation by lugs which slidably engage slots formed in a ring 112 secured to and projecting to one side of the ring gear 99. The other plates of the clutch element 111 are supported on pins similar to the pins 89 and slidably disposed in openings in the inner peripheral parts of the drum 107. The plates of the clutch element 111 are adapted to be frictionally engaged by being compressed between the piston 109 and a pressure plate 113 projecting inwardly from the inner part of the drum 107. The plates of the clutch element 111 are adapted to be separated by springs 114 disposed in openings formed within the drum 107 and compressed between the drum 107 and washers 116 disposed on pins 117 mounted for slidable motion in the drum 107 and the ends of which are adapted to be held in resilient engagement with the piston 109. The piston 109 is moved to compress the springs 114 and to engage the clutch plates 111 by fluid under pressure applied to the expansion chamber 118 between the piston 109 and the cylinder 106.

Any suitable reverse mechanism may be employed with the transmission 10. Such a mechanism may be provided by the planetary gear set indicated at 121 and having a carrier 122 carrying planet gears 123 which mesh with a sun gear 124. The sun gear 124 forms a part of a tubular shaft 125 which is splined to a disk 130 rigidly secured to the ring gear 77. The ring gear 121 has a support 126 formed at one side thereof and the inner hub 127 of which is rotatably mounted on a collar 128 which forms a part of the carrier 122. The outer part of the support 126 extends laterally to form a cone clutch element 129 adapted when the transmission 10 is operating in reverse to be secured between parallel cone shape clutch elements indicated at 131 and 132. The clutch element 131 is formed on a part of the casing 11 while the clutch element 132 forms a part of a piston 133 which operates within a cylinder 134 formed in the rear end wall of the casing 11. The piston 133 is adapted to be resiliently urged in a direction to release the cone clutch element 129 from between the stationary clutch elements 131 and 132 by a plurality of springs 137 disposed between the piston 133 and a ring 136 secured to an inner wall of the cylinder 134. An expansion chamber 140 which is formed between the piston 133 and the cylinder 134 is adapted to receive fluid under pressure for moving the piston 133 in such manner as to engage the cone element 129 between the clutch elements 131 and 132. Piston 133 is prevented from rotation by pins 141 which project into openings in the end of the casing 11 and into the piston 133.

The driven shaft 138 of the vehicle or device with which the transmission 10 is employed is disposed coaxially with respect to the shaft 38, is integral with carrier 74 and is disposed on a pilot 139 projecting rearwardly from shaft 38 and beyond the sun gear 72. The tubular shaft 125 carrying the sun gear 124 is rotatably mounted on a forward end of the shaft 138 and is secured to ring gear 77 by a disc 130. The shaft 138 is splined to the collar 128 which is formed integrally with one side of the carrier 122.

While any suitable step ratio reduction gear units may be employed in the transmission 10 it is proposed in the present instance to employ a ratio of 1.45 to 1 in the front unit 98, a ratio of 2.63 to 1 in the rear unit 73, and a 3 to 1 ratio in the reverse unit 121.

Figure 4:
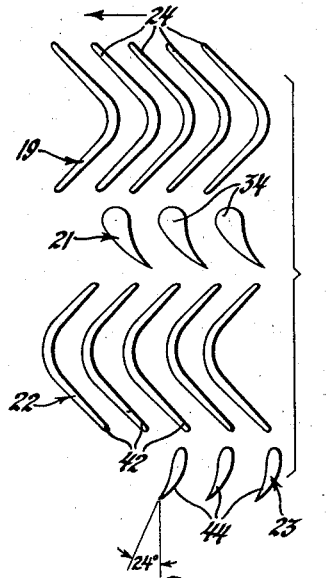
Figures 4, 5 and 6 are diagrammatical illustrations showing the angular positions of the vanes of the various elements of the fluid torque converter device with respect to the axis of rotation thereof and at different stator vane positions.
Figure 5:
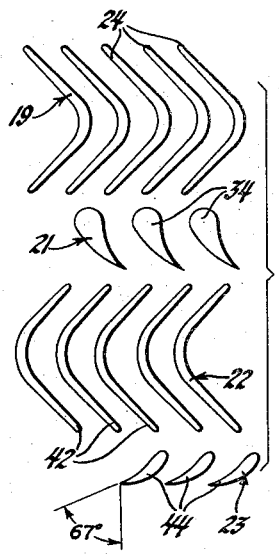
Figure 6:
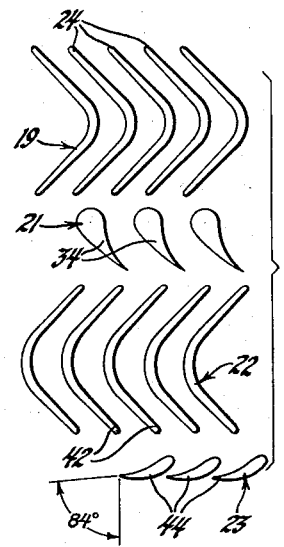

The principal requirement for adjusting the vanes of the stator 23 is that the angular position of the vanes with respect to the axis of rotation of the converter unit 18 should increase as the demand for torque on the turbines 21 and 22 increases and should decrease to a minimum when coupling occurs in the converter unit 18 and the stator 23 free wheels upon the brake 49. It has been found to be satisfactory to have a step ratio change in the positions of the vanes 44 with respect to the axis of rotation of the unit 18 as is shown in the different positions of the vanes 44 in Figures 4, 5 and 6. In Figure 4 the vanes 44 are set at a minimum exit angle of about 24° with respect to the axis of rotation of unit 18. In Figures 5 and 6 the angular positions of the vanes 44 with respect to the axis of rotation of the unit 18 are about 67° and 84° respectively.

Figures 4, 5 and 6 also illustrate the entrance and exit angles which may be employed with the fixed vanes of the impeller 19, the first turbine 21 and the second turbine 22. It has been found desirable to have the exit angles of the vanes 24 of the impeller 19 and of the vanes 34 and 42 of the turbines 21 and 22 respectively disposed at approximately 90° with respect to one another. It has been found to be satisfactory to construct the vanes 24 of the impeller 19 with exit and entrance angles of about 45° with respect to the axis of rotation of the unit 18 and the vanes 34 and 42 of the turbines 21 and 22 respectively with exit angles at 90° with respect to the exit angles of the vanes 24. It will be apparent that the exit angles of the vanes 34 and 42 also will be at 45° with respect to the axis of rotation of the unit 18. While exit angles of approximately 45° for the vanes 24, 34 and 42 have been found to provide a very satisfactorily operable converter unit for use in the transmission disclosed, it has also been found that these angles are not too critical. The principal characteristic of the turbines 21 and 22 are that the exit angles may be in the vicinity of 90° with respect to the exit angles of the vanes of the impeller 19 and that the exit angles of the fixed vanes 34 of the first turbine 21 may be in the low range of exit angles for first turbines. The low range for exit angles for first turbines may be said to be a range of from 30° to 60° with respect to the axis of rotation of the unit 18. This is a range in which good coupling is provided in the unit 18 when the stator 23 freewheels. The high torque demand on the first turbine 21 which is required for starting purposes and throughout the low range of vehicle speeds is satisfied by increasing the delivery angles of the vanes 44 of the stator 23 with respect to the axis of rotation of the unit 18. It has been found that increasing the exit angles of the vanes 44 of the stator 23 provides an extension of the torque output of the turbine 21 throughout the low range of vehicle speeds and up to about 40 miles per hour and extension of the output of turbine 22 to 60 miles per hour. When starting the vehicle, a first turbine having exit angles in the low range of from 30° to 60° and a stator with the vanes thereof adjustable from about 24° to about 84° will develop about the same torque as a first turbine having exit angles in the high range or above about 60°.

Figure 3:
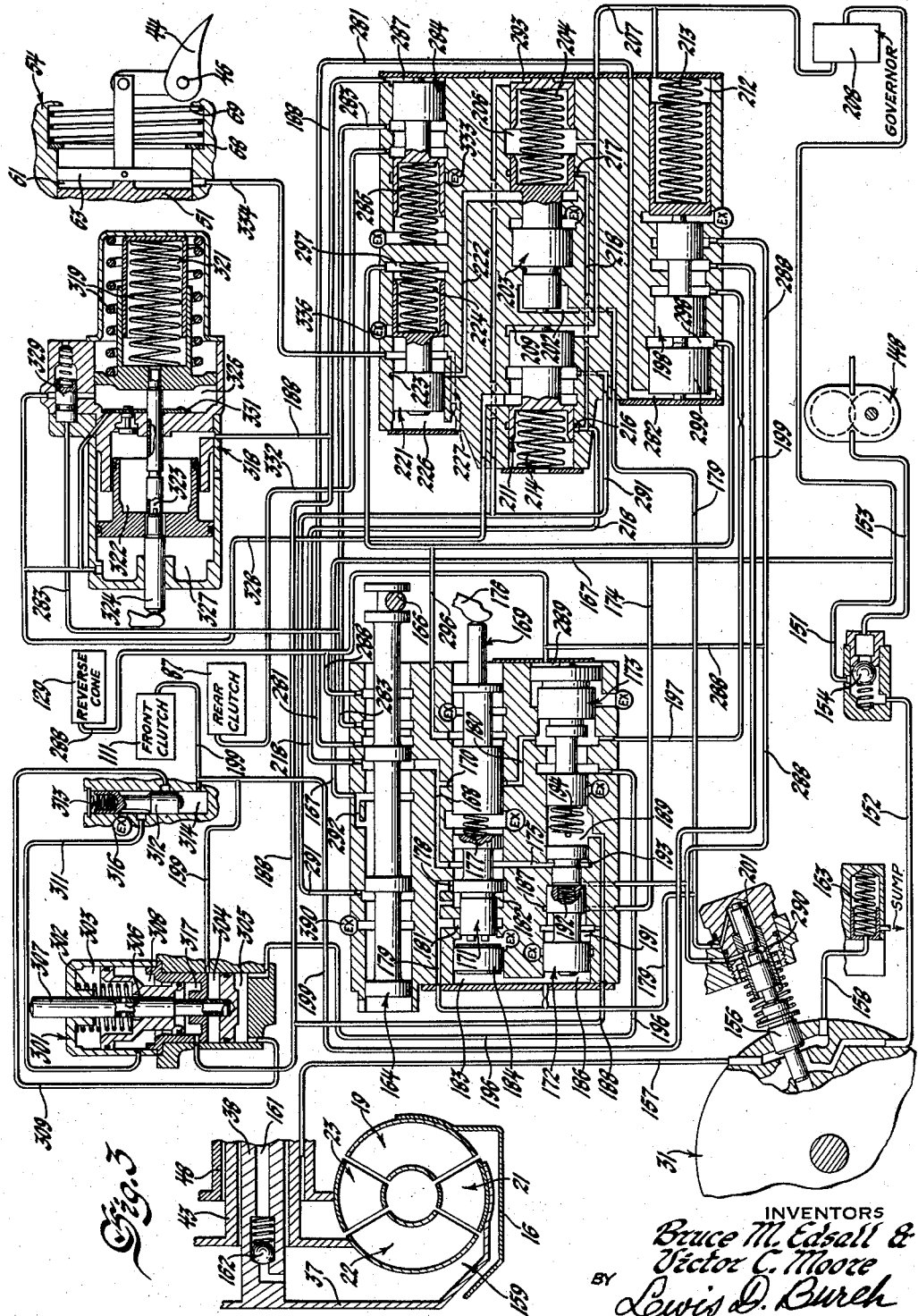
Figure 3 is a diagrammatical illustration of the hydraulic control and actuating mechanism employed in operating the transmission disclosed by Figure 1.

The transmission 10 is operated by the hydraulic control and actuating system illustrated by Figure 3. Fluid under pressure for operating the system is provided by pump 31 driven by impeller 19 for supplying fluid under pressure to the system when the engine is running and by pump 148 for supplying fluid for operating the system when the output shaft 138 is being driven by the coasting of the vehicle or otherwise. In the transmission 10 the pump 148 is driven by gear 149 secured to the carrier 122 of the planetary gear unit 121 which is always operable in the direction of rotation of the output shaft 138. Pumps 31 and 148 each supply fluid at a regulated pressure to a fluid supply line indicated at 151 and through fluid supply conduits 152 and 153 respectively. Conduit 153 discharges into supply lines 151 and 152 through a check valve indicated at 154 which prevents the escape of fluid through pump 148 when pump 148 is not being driven in the direction to pump. Pressure regulating valve 156 regulates the pressure delivered by pumps 31 and 148 by controlling the discharge of liquid therefrom to lines 157 and 158. Line 157 leads to chamber 159 formed in the interior of the converter element 18 and from which fluid may be exhausted to the sump for supplying pumps 31 and 148 through passage indicated at 161. The escape of fluid from the chamber 159 through the passage 161 is controlled by a spring closed valve indicated at 162. Fluid flowing through the passage 161 is employed in lubricating the various working parts of the transmission 10 and from which the fluid is returned to the sump for recirculation through the pumps 31 and 148. The conduit 158 leads to a pressure limiting valve 163 which also permits fluid to escape to the sump when the valve is opened by excess pressure in the line 158. The valves 156, 154 and 162 are operated to maintain a minimum pressure in the lines 151 and 152. Fluid is supplied to the line 157 and fluid is discharged from the valve 163 only after a predetermined maximum pressure is reached in the line 152.

A manual shift valve 164 actuated by a manual shift lever device 166 is employed for operating the transmission in driving range, low range, braking range, and in reverse range. The shift valve 164 also has a neutral position in which the transmission is maintained in operative condition but in which the output shaft 138 is not driven. Fluid under pressure for operating the transmission 10 throughout all of the ranges of operating thereof is supplied to the shift valve 164 by a supply line indicated at 167. Also throughout all ranges of operation of the transmission 10, except neutral, the valve 164 supplies fluid at line pressure through a line 168 to a port 170 extending around detent shift valve 169 and to throttle valve 171. Line 175 extending beyond valve 171 supplies line fluid to compensator pressure valve 172 and line 180 extending beyond valve 169 supplies line fluid to valve 173. The compensator pressure valve 172 also has a modulating port 187 which is supplied with fluid at line pressure through a line 174. Detent valve 169 is controlled by the accelerator pedal of the vehicle through arm 176. The force on the throttle valve 171 is also affected by the position of the accelerator pedal by reason of the spring 177 disposed between the valves 169 and 171.

In order to provide a supply of fluid pressure which varies approximately as the input torque, as measured by the opening of the throttle of the engine the valve 171 is provided with a modulating port 178 which tends to open in response to the throttle opening and tends to close in response to the throttle valve pressure in line 179 connected therewith. The throttle valve pressure in line 179 is supplied to an exhaust port 181 controlled by valve 171 and to chamber 182 in which the fluid pressure tends to move the valve 171 against the spring 177 to oppose the flow of fluid from line 168 into the port 178. The throttle valve pressure in line 179 also is supplied to a chamber 186 the fluid pressure in which tends to move valve 172 in such manner as to tend to open modulating port 187 for supplying line pressure to the valve 172. The fluid admitted by the valve 172 from the port 187 is supplied to compensator supply passage 188 which leads also to a chamber 189 in which fluid pressure is applied to the valve 172 in such manner as to tend to close the port 187. The fluid pressure in chamber 191 communicating with the port 187 also tends to move the valve 172 against the throttle valve pressure in chamber 186 and in such manner as to tend to close the port 187. Spring 192 also tends to close port 187 against the throttle valve pressure in the chamber 186. Line pressure in chamber 193 communicating with line 175 tends to reduce the force exerted by spring 192 in opposition to the pressure in the chamber 186. Compensator pressure in chamber 189 tends to compress spring 192 and to aid spring 194 in maintaining the valve 173 in position to supply line pressure from line 180 to passage 196. Line 197 supplies line pressure fluid to a front clutch shift valve indicated at 198. Valve 198 operates in such a manner as to apply the front clutch and release the front band simultaneously. The valve 198 may be operated in such manner as to supply line fluid to passage 199. Throttle valve pressure passage 179 also supplies fluid to chamber 201 in valve 156 for varying the line pressure supplied by line 167 to manual valve 164 in response to the position of the accelerator pedal. Throttle valve pressure from passage 179 also is supplied to chamber 202 which controls the operation of vane shift valve 203. The vane shift valve 203 also is actuated by a spring 204 and by governor pressure supplied to a chamber 206 by a governor pressure passage 207. The fluid pressure in passage 207 is supplied by a governor 208 which is driven by gear 149 of the transmission 10 (Figure 1) and in response to the rotation of the output shaft 138 in either direction. The governor pressure passage 207 also supplies fluid to chamber 209 for operating the rear servo shift valve 211 and to chamber 212 for operating the front clutch shift valve 198. Spring 213 assists the pressure in chamber 212 in operating the valve 198. Spring 214 opposes the operation of valve 211 by the governor pressure in chamber 209. Valves 211 and 203 are provided with annular ports 216 and 217 respectively and which are supplied with fluid at line pressure by a line 218. The flow of fluid in line 218 is controlled by the manual valve 164 which supplies line pressure to the line 218 whenever the valve is in any driving range position. When the vane shift valve 203 is moved by the throttle valve pressure in chamber 202 in opposition to spring 204 and the governor pressure in chamber 206 to open port 217 line pressure will be supplied from the line 218 and by a line indicated at 222 to a modulating port 223 of the vane modulating valve 221. Pressure in chamber 226, fed by passage 227, opposes spring 224 resulting in a modulated pressure in passage 334.

It will be apparent that the manual valve 164 may be moved into different positions for operating the transmission 10 in neutral, in drive range, in low range, in braking range, and in reverse range. In drive range line 167 supplies line fluid to line 168 and line 218. In low range the valve 164 is moved into position to also supply line pressure from line 167 to line 281 also communicating with valve 164. Line 281 is adapted to supply line pressure to chamber 282 for the purpose of moving the front clutch shift valve 198 into a position where it may cut off the flow of fluid from line 197 to line 199 and through valve 198. Beyond line 281 the manual valve 164 may be moved into the braking range position where line pressure also will be supplied by line 167 to line 283. Line 283 may supply fluid at line pressure to coast valve 284 also may be moved against spring 286 by compensator pressure supplied by line 188 to chamber 287. In reverse range the valve 164 is moved into position to supply line pressure to line 288. Line 288 may supply line pressure to a chamber 289 for moving valve 173 against spring 194, to chamber 290 for increasing the pressure in line 151 and to the front clutch shift valve 198. In reverse range position line 167 also may supply line pressure from line 167 to line 291 through by-pass passage 292. Line 291 may supply line pressure to the rear servo shift valve 211 and to chamber 293 of the vane shift valve 203. Fluid pressure in chamber 293 will tend to move valve 203 against the throttle valve pressure in chamber 202.

Detent valve 169 may be moved by the accelerator pedal actuated lever 176 to increase the compression of spring 177 and to connect line 168 to line 296. Line pressure in line 296 is supplied to chamber 297 in vane modulating valve 221 to aid spring 224 in opening modulating port 223. Line 296 also supplies line pressure to chamber 298 in valve 198 for separating valve 198 from plug 299 and moving valve 198 against spring 213 and governor pressure in the chamber 212.

A servo motor 301 is provided for applying and releasing the band 108 for the front gear unit 98. The servo 301 has a spring 302 tending to release the band 108 and chambers 303 and 304 also are provided for receiving fluid under pressure for releasing the band 108. Chambers 303 and 304 communicate with one another through a passage 306 in shaft 307 by which band 108 is applied and released. Chambers 303 and 304 are supplied with line pressure for releasing band 108 by line 199. Line 199 also supplies fluid to the pressure chamber 118 in cylinder 106 employed in engaging the clutch 111 of front gear unit 98 (Figure 2). Chambers 303, 304 and 118 are exhausted by line 199 when it is desired to release the clutch 111 and to apply the band 108. Servo 301 is also provided with chambers 305 and 308 in which line pressure is employed for applying the band 108. Chamber 305 is supplied with line pressure by line 196 while chamber 308 is supplied with line pressure from chamber 305 by lines indicated at 309 and 311 which may be made to communicate with one another through front servo exhaust valve 312. Exhaust valve 312 has a spring 313 which is adapted to be compressed by fluid supplied to chamber 314 to open line 311 to exhaust port 316 when line 199 supplies apply fluid to the front clutch 111 and release fluid to chambers 303 and 304. When such pressure is not applied to the chamber 314 the valve 312 will connect lines 309 and 311 for supplying apply pressure to the chamber 308 from the chamber 305. The servo 301 also is provided with a chamber 317 for applying variable compensator pressure tending to apply band 108. Chamber 317 is supplied with compensator pressure by passage 188.

Band 92 for the rear planetary gear unit 73 (Figure 1) may be operated by a servo motor indicated at 318. Rear servo 318 has a spring means 319 tending to apply band 92 to the drum 81 of the rear unit 73 (Fig. 1). Servo 318 also provides chambers 321 and 322 to which fluid under pressure may be supplied for applying band 92. Chambers 321 and 322 communicate with one another through a passage 323. Chambers 321 and 322 are supplied with compensator pressure from line 188 and tend to increase the pressure on band 92. Band 92 may be released from drum 81 (Fig. 1) by line pressure applied to the servo 318 in chambers 326 and 327. Chambers 326 and 327 may be supplied with fluid at line pressure through line 328 controlled by the rear servo shift valve 211. Line 328 communicates with chamber 326 through a quick release valve 329 and through a metering valve 331. Line 328 also communicates directly with chamber 327. The rear clutch 87 employed in unit 73 may be engaged by fluid applied to chamber 91 in cylinder 84 (Fig. 1). Chamber 91 may be supplied with such fluid for applying clutch 87 through line 332 controlled by coast valve 284. Chamber 91 also may be exhausted for releasing the clutch 87 by line 332 and exhaust port 333 controlled by coast valve 284. Fluid for quickly opening the valve 329 may be supplied by line 283. When the manual valve 164 is in braking range position chambers 326 and 327 also may be exhausted through line 328 and rear servo shift valve 211 which connects line 328 with line 291 controlled by manual valve 164.

The vanes 44 of the stator 23 may be moved to increase the angular position of the vanes with respect to the axis of rotation of the unit 18 (Fig. 1) by fluid pressure supplied to chamber 61 by passage 334 controlled by vane modulating valve 221 and vane shift valve 203.

The reverse planetary 121 (Fig. 1) may be operated by engaging the reverse cone 129 between clutch elements 131 and 132 in response to fluid under pressure supplied to the expansion chamber 135. Fluid may be supplied to the expansion chamber 135 by fluid line 288 when the manual valve 164 is moved into reverse range position. When the manual valve is not in the reverse range position the chamber 135 also will be exhausted through line 288.

The transmission 10 may be operated in drive range by shifting the valve 164 into a position to admit fluid at line pressure from line 167 to line 218. In such position of the valve 164 the operation of the transmission 10 will depend upon the input torque applied to the impeller 19 of the converter unit 18, which in an automotive vehicle will depend upon the position of the throttle of the engine. The operation of the transmission 10 will be described at throttle positions of 25°, 54° and at wide open throttle.

At 25° throttle position fluid will be supplied to the expansion chamber 118 for engaging the clutch 111 and to the chambers 304 and 303 in the front servo unit 301 for releasing the band 108 from the drum 107. Fluid at line pressure will be so applied for operating the clutch 111 and the band 108 by the flow of fluid into line 168, through port 170 around valve 169, through line 180 across valve 173, through line 197, through valve 198, through line 199 and into chambers 118 (Fig. 1), 304 and 303. Fluid also will be supplied by fluid line 199 to chamber 314 for operating the front servo exhaust valve 312 to exhaust chamber 308 to fluid line 311 through valve 312 and exhaust port 316. Fluid at line pressure also will be supplied to chamber 305 by valve 173 through line 196. Since the areas of the movable surfaces in chambers 304 and 305 are substantially equal it will be apparent that the fluid in chamber 303 and spring 302 will release band 108. Band 108 (Fig. 1) will be released notwithstanding the compensator pressure applied to chamber 317 of servo 301 which tends to apply band 108. Compensator pressure is applied to the chamber 317 by fluid line 188 which is controlled by the position of compensator valve 172. The area of the movable surface in chamber 317 is much smaller than the effective area of the movable surface in chamber 303, therefore compensator pressure will not apply the band 108.

If the motor vehicle is to be operated at anything from a closed throttle to a throttle open to the extent of 25° in normal driving range the front band 108 will be released, the front clutch 111 will be applied, the rear band 92 will be applied to a predetermined vehicle speed, the rear clutch 87 will be released and the reverse cone 129 will be released. Under such circumstances the ring gear 99 will be locked with respect to the sun gear 103 so that the entire front unit 98 will rotate at 1 to 1 ratio. Also, the ring gear 77 will be prevented from reverse rotation by the one way clutch 93, and the reverse planetary 121 will rotate. Under such circumstances the first turbine 21 is connected to the output shaft 138 through the 2.63 gear ratio of the rear planetary 73 and the second turbine 22 is connected directly to the output shaft 138 through the rear planet carrier 74.

Also at anything up to a 25 degree throttle position the stator 23 will have the vanes 44 thereof at the minimum torque multiplying position of about 24 degrees with respect to the axis of rotation of the unit 18 as is illustrated by Figure 3. The vanes will be held in such position during this range of throttle positions because the throttle pressure in line 179 and chamber 202 is not great enough to overcome spring 204. Under such circumstances no fluid under pressure will be supplied to the chamber 61 through line 222, valve 221 and line 334 to move piston 63 against the inertia of the fluid projected against the vanes 44 and the fluid pressure in chamber 159 of the converter 18.

If the engine is operating at the 25° throttle position the vehicle will start and will operate throughout the range of speeds through which the engine is capable of operating the vehicle at a 25° throttle position, as is illustrated by curve 351 shown on the chart illustrated by Figure 6. During the lower range of speeds shown by curve 351 the first turbine 21 and the second turbine 22 will be locked with respect to one another to rotate at a speed ratio of 2.63 for the first turbine to 1 for the second turbine and as the speed of the first and second turbines increases with respect to the impeller 19 the load will be progressively transferred from the first turbine to the second turbine until the point indicated at 352 is reached on the curve 351. At point 352 practically all of the load will be transferred to the second turbine thus tending to cause the ring gear 77 to rotate forwardly with the carrier 74 and to free wheel upon the freewheeling clutch 93. As the speed of the second turbine 22 increases with respect to the impeller 19 the point will be reached at which the second turbine commences to discharge fluid in a direction to cause the stator 23 to free wheel upon the one way brake 49. This point is indicated at point 353 on the curve 351. Beyond the point 353 the second turbine 22 may be said to be driving in coupling with respect to the impeller 19 and will drive the vehicle at a 1 to 1 torque ratio with respect to the output shaft 138 throughout any higher speed at which the engine will drive the vehicle at a 25° throttle position.

It will be noted that after the ring gear 77 commences to rotate in the direction of rotation of the carrier 74 and upon the free-wheeling clutch 93 there is no necessity for having the band 92 engage the drum 81. Such engagement between the clutch and the band requires that the plates of a clutch 87 rotate with respect to one another which may produce undesirable frictional losses. Means therefore is provided for releasing the band 92 at a vehicle speed high enough to insure that the ring gear 77 previously will have been free wheeling upon the freewheeling clutch 93. With the transmission illustrated it has been found that vehicle speeds up to 45 miles per hour are high enough to retain the band 92 in engagement with the drum 81. At this speed the governor pressure in line 207 (Fig. 3) supplied the chamber 209 will have moved rear servo valve 211 against spring 214 to a position where the port 216 will be open. When port 216 is open it will be apparent that line pressure will be supplied through line 328 to chambers 326 and 327 in the rear servo 318 and this pressure will tend to operate the rear servo to release the band 92. While it may be noted that compensator pressure will also be applied to chambers 322 and 321 of rear servo 318 and that compensator pressure tends to apply the rear band 92, compensator pressure nevertheless will not be great enough at any throttle position to apply the band in opposition to line pressure in the chambers 326 and 327.

The transmission 10 may be operated to provide the performance illustrated by curve 354 by further opening the throttle of the engine. In the present instance the valve 169 and the spring 177 are constructed in such a way that the throttle of the engine may be opened up to about 54° without moving valve 169 into a position to open line 168 to line 296. However, at a throttle opening of about 54° the compression of spring 177 will be increased to provide a higher modulated pressure in line 179. When this occurs throttle valve pressure in passage 179 will be the same as the line pressure in line 168. When the pressure in line 179 increases to a sufficient extent the pressure in chamber 202 of vane shift valve 203 will move the valve against spring 204 and governor pressure in chamber 206 to open port 217 so that line pressure may be supplied through line 222 to vane modulating valve 221 and port 223. It will be apparent however that as soon as any fluid is admitted through port 223 the pressure of such fluid will be applied to the chamber 226 through line 227 thereby tending to close port 223 against spring 224. However, the modulated pressure supplied to line 334 eventually will be sufficient to move piston 63 against ring 68 in the vane shift unit indicated at 54. Such movement of the piston 63 will increase the angular positions of the vanes 44 with respect to the axis of the converter 18 thereby considerably increasing the reaction upon vanes 44 when fluid is discharged from the second turbine 22 through the stator 23 to the inlet side of the impeller 19. In the present instance the intermediate angularity of the discharge of the stator vanes 44 with respect to the axis of the unit 18 may be about 67°. The increase in power delivered by the engine and represented by the movement of the throttle from a 25° to about a 54° position and the increase in torque multiplication resulting from changing the vanes 44 from a 24° position to a 67° position will increase the starting torque of the transmission 10 and will cause the extension in output torque illustrated by curve 354. With the stator vanes in the 67° position as is illustrated by curve 354 it will be noted that the output torque is higher at any given vehicle speed and that the point 356 at which the second turbine 22 takes over the entire load and the first turbine 21 free wheels upon the free-wheeling device 93 occurs at a higher output torque and at a higher vehicle speed. Point 357 on curve 354 indicates the point at which fluid from the second turbine 22 will commence to discharge in such a direction that the stator 23 will commence to free wheel. Owing to the fact that the converter unit 18 will operate more efficiently in coupling and just prior to coupling with the stator blades 44 in minimum angular positions with respect to the axis of rotation of the unit 18 than in the 67° position, it is considered desirable to return the vanes from the 67° positions to the 24° position at some vehicle speed where there is no increase in output torque provided by the vanes in the 67° position. Such condition will occur beyond the point 356 at which the first turbine 21 commences to free wheel. The transmission 10 therefore is provided with means for upshifting the stator vanes from the intermediate angular position of 67° to the minimum angular position of 24°. Line 358 indicates the speed at which such upshift in the vanes of the stator 23 may take place. The upshift referred to is brought about by the increase in governor pressure affecting the vane shift valve 203 by reason of the communication between the governor pressure line 207 and the chamber 206. Such increase in governor pressure in the chamber 206 and the force exerted by the spring 204 will balance the throttle valve pressure in chamber 202 at the throttle opening at which the engine is operating, and will cause the valve 203 to close the port 217. When port 217 is closed no fluid will be supplied to the vane modulating valve 221 through line 222 and the fluid pressure in the converter 18 will return the vanes 44 to the minimum position of about 24°. Since line 358 is at a car speed higher than the coupling point with the stator vanes in the minimum angle position, the stator will therefore free wheel. Beyond the line 358 the transmission 10 will be in a 1 to 1 torque ratio drive with the first turbine 21 free wheeling and the second turbine 22 operating in coupling with the impeller 19.

The transmission 10 also may be operated in driving range with the torque output performance illustrated by curve 359. When it is desired to increase the output torque as illustrated by curve 359 it is necessary to depress the throttle of the engine in such a way that the detent valve 169 will open the port 170 so that line pressure may be supplied through port 170 to line 296. When line pressure is supplied to line 296 it will be apparent that the vane modulating valve 221 will be moved to entirely open port 223 to allow line pressure to be supplied to the chamber 61 in the vane actuating device 54. When port 217 of the vane shift valve 203 and port 223 of the main modulating valve 221 are simultaneously wide open it will be apparent that full line pressure will be supplied by lines 222 and 334 to the chamber 61 in the vane actuating device 54. When line pressure is supplied to the chamber 61 the pressure on the piston 63 will be great enough to overcome the preloaded spring 69 to move vanes 44 into their maximum angular positions with respect to the axis of rotation of the unit 18. It has been found that a maximum angular position of about 84° is satisfactory for operation of the vanes 44 for supplying a maximum torque output from the converter unit 18. When full line pressure is supplied to the passage 296 it will be apparent that the front clutch shift valve 198 will be supplied with line pressure in the chamber 298. When line pressure is supplied to the chamber 298 the pressure therein will move the shift valve 198 away from the plug 299 to cause the valve to provide communication between passages 199 and 288 thereby discontinuing the flow of line pressure through valve 198 from passage 197 to passage 199. When line pressure is not supplied to the front servo 301 by passage 199 and passage 199 is connected to passage 288 it will be apparent that pressure in chambers 304 and 303 of the front unit servo 301 will be exhausted through passage 199, valve 198 and the open end of the manual valve 164 with which passage 288 is connected. When the fluid is exhausted in the servo 301 from chambers 304 and 303 the line pressure which is continuously applied to the chamber 305 will apply band 108 to drum 107 of the front planetary unit 98. However when chambers 304 and 303 are exhausted the fluid in chamber 314 of valve 312 also will be exhausted so that spring 313 will move valve 312 to close exhaust port 316 and to open communication between passages 309 and 311. Since passage 311 now communicates with chamber 305 through passage 309 and valve 312 it will be apparent that chamber 308 also will be supplied with line pressure from chamber 305 and that this force will be added to the force exerted by the fluid in chamber 307 for applying the band 108. It will also be apparent that passage 199 will exhaust chamber 118 of the front clutch 111 thereby releasing the elements of the clutch 111 and the band 108 being applied will prevent rotation of the sun gear 103 of the front planetary 98. With the sun gear 103 held stationary it will be apparent that the carrier 97 will no longer be connected to the second turbine 22 at a 1 to 1 ratio but will be connected to the second turbine through the step ratio of the front planetary 98. It has been found that a suitable step ratio for the planetary 98 is a 1.45 to 1 ratio so that under such circumstances it will be apparent that the second turbine 22 will tend to drive the output shaft 138 at a 1.45 ratio which is the ratio of the planetary 98 and that the first turbine 21 will tend to drive the output shaft 138 at a 2.63 to 1 ratio which is the ratio of the rear planetary 73. With the first turbine driving the output shaft 138 through the rear planetary 73 and the second turbine 22 driving the output shaft 138 through the front planetary 98 it will be apparent that the speed ratio between the first and second turbines will be 1.81 to 1 and that the transmission 10 will deliver the greater torque output at higher speeds indicated by the curve 359. However, as the torque output of the first turbine 21 decreases and the torque output of the second turbine 22 increases the first turbine 21 will eventually free wheel through the free-wheeling device 93 at the point indicated at 361. As the speed of the second turbine 22 continues to increase it will be apparent that the stator 23 will free wheel at point 362 or at line 358 where the vanes of the stator 23 are returned to the minimum angular position with respect to the converter unit 18 as previously described. As the vehicle speed increases it may be considered desirable to upshift the front planetary 98 to again place the second turbine 22 in direct drive relation to the output shaft 138. Point 363 on curve 359 indicates a point at which the front planetary 98 may be so upshifted and under which circumstances the output torque will drop to the value indicated by curve 354 at point 364. Such upshift of the planetary 98 will occur when a vehicle speed is reached where governor pressure in chamber 212 and spring 213 will move the front clutch shift valve 198 to close passage 288, to close the communication between passages 199 and 288, and to open communication between passage 199 and passage 197 supplying line pressure from lines 180, 168 and 167. When such event occurs which in the present instance is illustrated as occurring at about 75 miles per hour vehicle speed, the operation of the front servo 301 will release band 108 and the front clutch 111 will be engaged as hereinbefore described.

Figure 7:
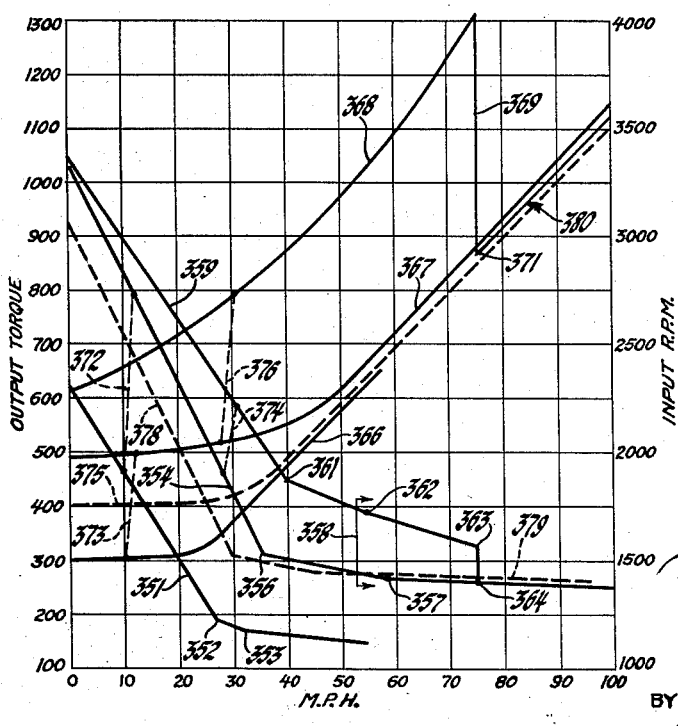
Figure 7 is a chart showing the performance characteristics of a transmission embodying the principles of the invention and operating under different conditions of operation.

In Figure 7 curve 366 indicates the engine speed that might occur at various vehicle speeds with the engine operating at a 25° throttle position and the transmission operating according to the curve 351. It will be noted that the first part of curve 366 is relatively flat which indicates that the engine speed does not increase to any great extent below 25 miles per hour vehicle speed. Curve 367 indicates the engine speed when operating with the 54° throttle position and under the conditions in the transmission illustrated by curve 354. It will be noted also that curve 367 is relatively flat throughout the first part of the curve which indicates that the engine speed does not increase a very great rate below 40 miles per hour vehicle speed. Curve 368 illustrates the engine speed when the transmission is operating at full throttle and according to the curve 359. It will be noted that there is a rising characteristic in engine speed to provide maximum horsepower output of the engine consistent with requirements at various vehicle speeds up to the time when the front planetary upshift occurs. Such upshift may occur at a point on curve 368 which corresponds to point 363 on curve 359 and at such time the engine speed will decrease along line 369 to point 371 where it intersects curve 380. Dash line 372 indicates what would happen in the event the vehicle were started at a 25° throttle position and then at about 4 miles per hour the engine throttle were suddenly opened to 54°. Under such circumstances the torque delivered by the transmission would increase from line 351 to curve 354 approximately along line 372. Under such circumstances the engine speed would also increase as is indicated by dash lines 373 from curve 366 to curve 367. If thereafter and at approximately 27 miles per hour the throttle were further opened beyond detent and to a point requiring the down-shift of the front unit 98 as previously described, the transmission output torque would change as indicated by dash line 374 and the engine speed would change as is indicated by dash line 376 from curve 367 to curve 368. It will be apparent that all such changes that might occur in the transmission below 30 to 40 miles per hour would be gradual or modulated changes and would not result in any appreciable shift feel in the operation of the transmission. The dash line 378 illustrates what would happen in the transmission 10 if the engine were operated at a throttle opening of approximately 54° but without shifting the stator vanes from the minimum position of 24° to the intermediate position at 67°. Under such circumstances there would be a considerably higher output torque due to the increased power of the engine. Due to the increased power the first turbine would carry torque up to 30 m.p.h. and the second turbine would carry more than input torque up to 45 m.p.h. It will be noted that at car speeds to the right of line 358 the output torque of the transmission is greater with the stator vanes in the 24° position than in the 67° position at the same throttle opening. It will be noted that line 378 and line 354 up to line 358 indicate the extension that may be obtained at substantially a relatively constant throttle opening of about 54°. The divergence in the lines 378, 354 and 359 indicates the extension in performance of the transmission operating at substantially constant input torque and with a 24° stator vane indicated by the line 378, with a 67° stator vane indicated by the line 354 and with an 84° stator vane and the downshift of the front planetary 98 as is indicated by the curve 359. It will be noted that this extension in performance can be obtained with the first turbine having fixed vanes positioned at angles of from 30° to 60° with respect to the axis of rotation of the unit 18 and merely by changing the angles of the stator vanes 44 and/or downshifting the planetary unit 98. Curve 375 indicates the speed of the engine when the transmission is operated in such manner as to have the performance indicated by the curve 378. It will be noted from the curves illustrated by Figure 7 that all these changes in condition can be made below 30 to 40 miles per hour without resulting in objectionable shift feel.

The transmission 10 also may be operated in low range merely by operating the manual valve 164 in a manner to supply line pressure from line 167 to line 281. When line pressure is supplied to line 281 it will be apparent that pressure in chamber 282 will act on plug 299 of the front clutch shift valve 198 to move valve 198. Under such circumstances band 108 will be applied and clutch 111 will be released as previously described to connect the second turbine 22 to the output shaft 138 through the step ratio reduction unit employed in front planetary 98. Under such circumstances the transmission 10 will operate throughout a range of stator vane angles as in the normal driving range. At vehicle speeds of less than 75 miles per hour the transmission torque ratio will never be less than 1.45 to 1. At full throttle in this range the characteristics will be identical to those obtained at full throttle in normal driving ranges as illustrated by curve 359.

The transmission 10 also may be operated in braking range simply by shifting the valve 164 into a position to admit line pressure into passage 283. Above throttle openings of 1½° this range is identical with low range. During coast at less than 1½° throttle the second turbine 22 will be driven through the 1.45 step ratio, which increases engine friction available for braking. Passage 283 will supply line pressure through coast valve 284 and passage 332 to chamber 91 for engaging the rear clutch 87 because compensator pressure in chamber 287 is insufficient to overcome spring 286. This allows clutch 87 to be engaged at throttle openings of from 0 to 1½°. When the clutch 87 is engaged it will be impossible for the first turbine 21 to free wheel through the free-wheeling clutch 93. Since the first turbine cannot free wheel during coast conditions it will be apparent that there will be a loss in the converter due to the fact that the first turbine 21 must rotate faster than the second turbine 22. This results in a churning loss in the converter which absorbs additional horsepower for braking above that available from the engine. Such churning action will brake the vehicle throughout the relatively high range of speeds where such braking is desired.

The transmission 10 may be operated in reverse by further shifting the valve 164 so that line pressure will be supplied to passage 288. When line pressure is supplied to the passage 288 and to chamber 137 in cylinder 134 the reverse cone 129 of the planetary unit 121 will be prevented from rotation and the driven shaft 138 will be reversed by operation of the planetary gear units 73 and 121.

When the transmission is in neutral the valve 164 is shifted into a position to cut off the supply line 167 from line 168 and lines 218, 281, 283 and 288. However, valve 164 also will cut off line 291 from the exhaust port 290. Under such circumstances the band 108 will be released, clutch 111 will be released, band 92 will be released, clutch 87 will be released and the reverse cone 129 will be released. Under such circumstances the impeller 19 may be operated without driving the output shaft 138 in either direction.

We claim:

1. A torque converter for an engine having a throttle and comprising an impeller, a first turbine, a second turbine and a stator, all adapted to rotate about a common axis and to circulate fluid in a closed path, means for rotating said impeller for delivering said fluid successively to the vanes of said first turbine and said second turbine, means preventing the opposite rotation of said stator with respect to said impeller, said vanes of said first turbine being positioned in fixed and parallel relation to one another about said axis for delivering the said fluid into the vanes of said second turbine and said stator, a driven shaft for said converter, step ratio reduction gear means connecting said first turbine to said driven shaft, step ratio reduction gear means connecting said second turbine to said driven shaft, means directly connecting said second turbine to said driven shaft, means responsive to the position of the throttle of said engine for alternately rendering inoperative one or the other of said means connecting said second turbine to said driven shaft, and means for changing the angular relation of the vanes of said stator with respect to said axis in response to changes in the position of said engine throttle.

2. A torque converter comprising an impeller, a first turbine, a second turbine and a stator, all adapted to rotate about a common axis and to circulate fluid in a closed path, means for rotating said impeller for delivering said fluid successively into the vanes of said first turbine and said second turbine, means preventing the opposite rotation of said stator with respect to said impeller, a driven shaft for said converter, planetary step ratio reduction gear means adapted to connect said first turbine and said second turbine to said driven shaft, said planetary step ratio reduction gear means having a planet carrier, a sun gear and a ring gear, means connecting said driven shaft to said second turbine through said planet carrier, means connecting said sun gear to said first turbine, freewheeling clutch means preventing the rotation of said ring gear except in the direction of rotation of said sun gear, and means for changing the angular relation of the vanes of said stator with respect to said axis as the torque demand on said driven shaft changes.

3. A torque converter comprising an impeller, a first turbine, a second turbine and a stator, all adapted to rotate about a common axis and to circulate fluid in a closed path, means for rotating said impelled for delivering said fluid successively into the vanes of said first turbine and said second turbine, means preventing the opposite rotation of said stator with respect to said impeller, a driven shaft for said converter, planetary reduction gear means for connecting said first turbine and said second turbine to said driven shaft, said planetary gear means having a planet gear carrier, a sun gear and a ring gear, means for connecting said sun gear to said first turbine, means for connecting said planet gear carrier to said second turbine, freewheeling means adapted to prevent rotation of said ring gear except in the direction of rotation of said sun gear, and means for preventing rotation of said ring gear in any direction.

4. A torque converter adapted for use with an engine having a throttle and comprising an impeller, a first turbine, a second turbine and a stator, all adapted to rotate about a common axis and to circulate fluid in a closed path, means for rotating said impeller for delivering said fluid successively into the vanes of said first turbine and said second turbine, means preventing the opposite rotation of said stator with respect to said impeller, a driven shaft for said converter, reduction gear means connecting said first turbine to said driven shaft, reduction gear means adapted to connect said second turbine to said driven shaft, shaft means adapted for directly connecting said second turbine to said driven shaft, manual shift means for rendering inoperative one or the other of said means for connecting said second turbine to said driven shaft, means responsive to the position of said throttle of said engine for rendering inoperative one or the other of said means for connecting said second turbine to said driven shaft, and means for changing the angular relation of the vanes of said stator with respect to said axis as the torque demand on said driven shaft changes.

5. A torque converter comprising an impeller, a first turbine, a second turbine and a stator, all adapted to rotate about a common axis and to circulate fluid in a closed path, means for rotating said impeller for delivering said fluid successively into the vanes of said first turbine and said second turbine, means preventing the opposite rotation of said stator with respect to said impeller, means for changing the angular relation between the vanes of said stator and said axis, a driven shaft for said converter, means connecting said first turbine and said second turbine to said driven shaft for operation of said first turbine and said second turbine at different speeds, overrunning clutch means for said first turbine and permitting the rotation of said first turbine at substantially the speed of said second turbine when the torque demand on said first turbine is negative, means rendering said last means inoperative, and means for changing the angular position of the vanes of said stator to a low angular position with respect to said axis when said means preventing the operation of said overrunning clutch is operative.

6. A torque converter comprising an impeller, a first turbine, a second turbine and a stator, all adapted to rotate about a common axis and to circulate fluid in a closed path, means for rotating said impeller for delivering said fluid successively into the vanes of said first turbine and said second turbine, means preventing the opposite rotation of said stator with respect to said impeller, a driven shaft for said converter, front and rear planetary reduction gear means for said converter and each having sun gear means, planet carrier means and ring gear means, means directly connecting the planet carrier means of said planetary gear means to one another, means directly connecting the sun gear means of said rear planetary gear means to said first turbine, means directly connecting the ring gear means of said front planetary gear means to said second turbine, means directly connecting the carrier of said rear planetary gear means to said driven shaft, means for locking the ring gear means of said front planetary gear means against rotation in either direction, means for locking said ring gear means of said rear planetary gear means against rotation in one direction, means for locking said sun gear means and said ring gear means of said front planetary gear means against relative rotation, means for locking the ring gear means of said front planetary gear means against rotation with the sun gear of said front planetary gear means, control means for alternately locking said ring gear of said front planetary gear means against rotation and for rotation with the sun gear means of said front planetary gear means, and means for changing the angular relation of the vanes of said stator with respect to said axis when said ring gear means of said front planetary means is locked in either position.

7. A torque converter adapted for use with an engine having a throttle and comprising an impeller, a first turbine, a second turbine and a stator, all adapted to rotate about a common axis and to circulate fluid in a closed path, means for rotating said impeller for delivering said fluid successively into the vanes of said first turbine and said second turbine, means preventing the opposite rotation of said stator with respect to said impeller, a driven shaft for said converter, step ratio reduction gear means connecting said first turbine to said driven shaft, step ratio reduction gear means adapted to connect said second turbine to said driven shaft, means adapted directly to connect said second turbine to said driven shaft, throttle actuated means adapted alternately to connect said second turbine directly or to said driven shaft through said step ratio reduction gear means, and means for changing the angular relation of the vanes of said stator with respect to said axis when said second turbine is connected to said driven shaft directly or through said step ratio gear means.

8. A torque converter comprising an impeller, a first turbine, a second turbine and a stator, all adapted to rotate about a common axis and to circulate fluid in a closed path, means for rotating said impeller for delivering said fluid successively into the vanes of said first turbine and said second turbine, means preventing the opposite rotation of said stator with respect to said impeller, said vanes of said first turbine being positioned in fixed and parallel relation to one another about said axis with the exit angles thereof at low torque capacity angular positions of from 30° to 60° with respect to said axis for delivering said fluid into the vanes of said second turbine and said stator, a driven shaft for said converter, step ratio reduction gear means connecting said first turbine to said driven shaft, step ratio reduction gear means adapted to connect said second turbine to said driven shaft, means adapted to directly connect said second turbine to said driven shaft, said second turbine being compelled to rotate in the same direction as said first turbine, means alternately rendering one or the other of said means inoperative for connecting said second turbine to said driven shaft, and means for changing the angular relation of the vanes of said stator with respect to said axis as the torque demand on said driven shaft changes to vary the range of torque multiplication transmitted by said first turbine.

References Cited in the file of this patent

UNITED STATES PATENTS

| | | |
|---|---|---|
| 2,055,895 | Fawcett | Sept. 29, 1936 |
| 2,203,177 | Patterson | June 4, 1940 |
| 2,292,384 | Lysholm | Aug. 11, 1942 |
| 2,316,390 | Biermann | Apr. 13, 1943 |
| 2,318,660 | Barrett | May 11, 1943 |
| 2,327,660 | Jandasek | Aug. 24, 1943 |
| 2,383,980 | Lysholm | Sept. 4, 1945 |
| 2,408,008 | Tipton | Sept. 24, 1946 |
| 2,782,659 | Kelley | Feb. 26, 1957 |

FOREIGN PATENTS

| | | |
|---|---|---|
| 444,171 | Great Britain | Mar. 16, 1936 |